(12) United States Patent
Matsumoto et al.

(10) Patent No.: US 8,343,635 B2
(45) Date of Patent: Jan. 1, 2013

(54) MULTI-LAYERED SHEET OF ALUMINUM ALLOYS

(75) Inventors: Katsushi Matsumoto, Kobe (JP); Eiichi Tamura, Kobe (JP); Masao Kinefuchi, Kobe (JP); Toshiki Ueda, Moka (JP); Fumihiro Koshigoe, Moka (JP); Shimpei Kimura, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 274 days.

(21) Appl. No.: 12/867,127

(22) PCT Filed: Feb. 5, 2009

(86) PCT No.: PCT/JP2009/051998
§ 371 (c)(1),
(2), (4) Date: Aug. 11, 2010

(87) PCT Pub. No.: WO2009/101896
PCT Pub. Date: Aug. 20, 2009

(65) Prior Publication Data
US 2011/0014494 A1    Jan. 20, 2011

(30) Foreign Application Priority Data

Feb. 12, 2008  (JP) ................. 2008-030679
Feb. 12, 2008  (JP) ................. 2008-030680
Nov. 25, 2008  (JP) ................. 2008-299562

(51) Int. Cl.
*B32B 15/20* (2006.01)
*F28F 21/08* (2006.01)

(52) U.S. Cl. .... 428/654; 148/535; 165/905; 228/262.51

(58) Field of Classification Search ........................ None
See application file for complete search history.

(56) References Cited

U.S. PATENT DOCUMENTS 3,994,695 A * 11/1976 Setzer et al. ................. 428/654
5,125,452 A *  6/1992 Yamauchi et al. ............ 165/133
(Continued)

FOREIGN PATENT DOCUMENTS
EP    0 712 681 A2    5/1996
(Continued)

OTHER PUBLICATIONS
Machine translation of JP 08-246117. Sep. 1996.*
(Continued)

*Primary Examiner* — John J Zimmerman
(74) *Attorney, Agent, or Firm* — Oblon, Spivak, McClelland, Maier & Neustadt, L.L.P.

(57) ABSTRACT

Provided is a multi-layered sheet which has undergone heating corresponding to brazing, such as an aluminum-alloy radiator tube, or a multi-layered sheet such as an aluminum-alloy brazing sheet. The multi-layered sheet can have a reduced thickness and has excellent fatigue properties. The multi-layered sheet of aluminum alloys comprises a core layer (2) which has been clad at least with a sacrificial layer (3). This multi-layered sheet is a multi-layered sheet to be subjected to brazing or welding to produce a heat exchanger or is a multi-layered sheet which has undergone heating corresponding to brazing. The core layer (2) comprises a specific 3000-series composition. In this core layer (2), the average density in number of dispersed particles having a specific size has been regulated. As a result, fatigue properties, which govern cracking, can be highly improved.

20 Claims, 5 Drawing Sheets

U.S. PATENT DOCUMENTS

| | | | |
|---|---|---|---|
| 7,255,932 B1 * | 8/2007 | Kilmer | 428/654 |
| 7,387,844 B2 * | 6/2008 | Ueda et al. | 428/654 |
| 8,247,083 B2 * | 8/2012 | Izumi et al. | 428/654 |
| 2006/0141282 A1 | 6/2006 | Ueda et al. | |
| 2007/0246509 A1 * | 10/2007 | Koshigoe et al. | 228/101 |
| 2009/0020585 A1 | 1/2009 | Fukumoto et al. | |
| 2009/0165901 A1 | 7/2009 | Koshigoe et al. | |
| 2011/0236717 A1 | 9/2011 | Ueda et al. | |
| 2011/0287277 A1 | 11/2011 | Kimura et al. | |

FOREIGN PATENT DOCUMENTS

| | | |
|---|---|---|
| EP | 0 712 681 A3 | 5/1996 |
| EP | 1 666 190 A1 | 6/2006 |
| EP | 2 017 032 A2 | 1/2009 |
| EP | 2 017 032 A3 | 1/2009 |
| EP | 2 085 214 A1 | 8/2009 |
| JP | 8 246117 | 9/1996 |
| JP | 9 78168 | 3/1997 |
| JP | 9 95749 | 4/1997 |
| JP | 10 53827 | 2/1998 |
| JP | 11 100628 | 4/1999 |
| JP | 2000 119783 | 4/2000 |
| JP | 2003 82427 | 3/2003 |
| JP | 2005 139505 | 6/2005 |
| JP | 2006 291311 | 10/2006 |
| JP | 2009 24221 | 2/2009 |
| WO | WO 2007/131727 A1 | 11/2007 |

OTHER PUBLICATIONS

Extended European Search Report issued on Jun. 25, 2012, in patent Application No. 11008471.2.

Supplementary Search Report issued Mar. 21, 2011 in European Patent Application No. 09709940.2-2122/2248924.

International Search Report issued Apr. 28, 2009 in PCT/JP09/051998 Feb. 5, 2009.

* cited by examiner

MULTI-LAYERED SHEET OF ALUMINUM ALLOYS

TECHNICAL FIELD

The present invention relates to a multi-layered sheet of aluminum alloys for an aluminum-alloy heat exchanger (hereinafter, aluminum is also referred to as Al), and more particularly relates to a multi-layered sheet of aluminum alloys excellent in fatigue properties. In the present invention, a multi-layered sheet including at least a core layer and a sacrificial layer, being cladded, is a material for a heat exchanger, to be used for a heat exchanger by brazing. The multi-layered sheet is referred to as a multi-layered sheet of aluminum alloys, a multi-layered sheet of aluminum alloys before brazing process, or also simply a material of a multi-layered sheet. Whereas, a multi-layered sheet including at least a core layer and a sacrificial layer, being cladded, and subjected to a heat treatment equivalent to brazing is referred to as a multi-layered sheet of aluminum alloys after brazing process, or also simply as a multi-layered sheet after brazing process.

BACKGROUND ART

In order to reduce the weight of the body of an automobile, use of aluminum-alloy materials also for automotive heat exchange parts in place of conventionally used copper-alloy materials has been increasing. Then, for the aluminum-alloy materials for heat exchange parts, there have been used corrosion-resistant aluminum-alloy materials including a multi-layered sheet (which may also be referred to as a clad sheet or a clad material).

When such a multi-layered sheet is brazed to be assembled into a heat exchanger, the multi-layered sheet is formed into a brazing sheet including a core layer made of aluminum alloy on one side of which a sacrificial layer (sheet) is cladded, and on the other side of which a braze clad layer is cladded.

FIG. 4 shows an example of a heat exchanger (radiator) for an automobile made of aluminum alloy. As shown in FIG. 4, in a radiator 100, generally, between a number of radiator tubes 111 made of aluminum alloy and in the form of flat tubes provided therein, a heat radiation fin 112 made of aluminum alloy and processed in corrugated form is formed integrally. Opposite ends of the tubes 111 are configured to respectively open into the spaces formed by headers 113 and tanks (not shown). With the radiator 100 in such a configuration, a heated refrigerant is fed from the space of one tank through the inside of each tube 111 into the space on the other tank side. Thus, in the portions of the tubes 111 and the heat radiation fin 112, heat exchange is performed, so that the cooled refrigerant is circulated again.

The tube 111 made of an aluminum-alloy material includes a brazing sheet 101 made of aluminum alloy. FIG. 5 shows a cross section of the brazing sheet 101 made of aluminum alloy. In FIG. 5, the brazing sheet 101 is configured such that, on one side surface of a core layer 102 made of aluminum alloy, a sacrificial layer made of aluminum alloy (which is also referred to as a coating material) 103 is stacked (cladded), and on the other side surface of the core layer 102, a braze clad layer 104 made of aluminum alloy is stacked (cladded). Incidentally, in the case of the clad sheet made of aluminum alloy, the sheet is formed as a multi-layered sheet including only the sacrificial layer 103 cladded on one surface thereof.

Such a brazing sheet 101 made of aluminum alloy is formed into a flat tube by a forming roll or the like, and undergoes electro-resistance welding or brazing heating. As a result, the brazing sheet 101 itself is brazed, resulting in formation of the fluid passage as with the tube 111 of FIG. 4.

The main component of the refrigerant (coolant) of the radiator is a water-soluble medium. A refrigerant containing this and appropriately a commercially available corrosion inhibitor and the like is used. However, when such a refrigerant is used, by an acid formed upon deterioration with time of the corrosion inhibitor and the like, the aluminum-alloy materials such as the sacrificial layer and the core layer unfavorably become more susceptible to corrosion. For this reason, use of an aluminum-alloy material having a high corrosion resistance to the water-soluble medium becomes essential.

Therefore, for the core layer 102 made of aluminum alloy for use in a multi-layered sheet of a brazing sheet or a clad sheet, from the viewpoints of corrosion resistance and strength, there is used an Al—Mn series (3000-series) alloy, such as 3003 which includes a composition such as Al-0.15 mass % Cu-1.1 mass % Mn specified in JIS H4000. Whereas, for the sacrificial layer 103 normally in contact with the refrigerant, alloys of Al—Zn series such as 7072 including a composition of Al-1 mass % Zn, or Al—Zn—Mg series (7000-series) are used aiming at preventing corrosion and increasing the strength by Mg diffusion into the core layer 102. Further, for the braze clad layer 104, there is used an Al—Si series (4000-series) alloy such as 4045 including a composition such as Al-10 mass % Si which is low in melting point.

The radiator 100 is assembled integrally by brazing using the tubes 111 formed using such a brazing sheet 101, the heat radiation fin 112 subjected to corrugate processing, and other parts. The brazing methods include a flux-brazing method, a Nocolok brazing method using a non-corrosive flux, and the like. Thus, brazing is performed by heating to a temperature as high as around 600° C.

In the radiator 100 thus assembled, particularly, in the tubes 111, the liquid refrigerant which is at from high temperatures to low temperatures, and high pressures to normal pressures always flows/circulates. Namely, the tubes 111 are repeatedly applied with stresses such as fluctuations in internal pressure thereof and vibration of the automobile itself over a long time. Accordingly, the tubes 111 are required to have fatigue properties withstanding them. If the fatigue properties are low, and fatigue fracture occurs, the fatigue fracture occurs as a crack of the tube 111, and develops to penetrate through the tube 111. This causes leakage of liquid from the radiator. For this reason, the improvement of the fatigue properties of the radiator tube is an important problem.

Conventionally, various improvements of the fatigue properties of the radiator tube have been proposed. For example, Patent Document 1 is intended to attain the following. The core layer in the brazing sheet made of aluminum alloy is an aluminum alloy including Cu, Ti, and Mn, and regulated on Si, Fe, and Mg. The mean grain size L in the rolling direction in the longitudinal section of the core layer is set at 150 to 200 μm, thereby to improve the corrosion resistance of the weld part of the tube. As a result, the fatigue fracture property due to repeated bending of the tube, i.e., the vibration fatigue resistance under automotive vibration is improved. Patent Document 2 is intended to attain the following. The mean grain size in the direction of thickness on the sacrificial layer side is set at less than the thickness of the sacrificial layer. This improves the corrosion resistance of the sacrificial layer. As a result, the fatigue fracture property due to the repeated bending of the tube, and repeated internal pressure load, i.e., the fatigue properties are improved.

Further, it is generally known that the fatigue properties are related to the static tensile strength. Also for the heat exchanger, for example, as in Patent Document 3, there is proposed a material including Cu added therein in order to improve the tensile strength of the material. Then, Patent Document 4 is intended to improve the vibration fatigue resistance by the improvement in microstructure. Namely, in Patent Document 4, in a heat exchanger using an aluminum-alloy brazing sheet of a three-layer construction in which a Cu-containing aluminum-alloy core layer, an aluminum-alloy braze clad layer, and a Zn- and Mg-containing aluminum-alloy sacrificial layer are cladded, the following is proposed. In the heat exchanger, in the core layer side interface part in the vicinity of the interface between the core layer and the sacrificial layer of the brazing sheet after brazing, specific Al—Cu—Mg—Zn series precipitates are distributed. This is intended to attain the following: the strength of the core layer side interface part is enhanced by age-hardening due to Al—Cu—Mg—Zn series precipitates; this improves the fatigue fracture property due to a repeated internal pressure load, i.e., the fatigue properties.

Further, in Patent Document 5, a brazing sheet made of aluminum alloy includes a core layer of Al—Mn series alloy, a sacrificial layer such as Al—Zn series alloy cladded on one side surface of the core layer, and a braze clad layer of Al—Si series alloy cladded on the other side surface of the core layer. The texture of the brazing sheet is defined with the X-ray diffraction intensity ratio. In Patent Document 5, plastic deformation in a direction parallel with the rolling direction of the brazing sheet tends to uniformly occur. As a result, even when a tensile or compressive cyclic stress is applied in the rolling direction of the brazing sheet, deformation ceases to locally concentrate. This delays the development of cracks in the thickness direction, which can improve the fatigue life of the brazing sheet including the fatigue in the plastic region.

Other than these, in order to improve the corrosion resistance of not a brazing sheet but a heat radiation fin including the same 3000-series aluminum alloy, it is proposed that the shapes and the number densities of constituent particles and intermetallic compounds in the microstructure are defined (see, e.g., Patent Documents 6, 7, and 8). Corrosion of such a heat radiation fin leads to disappearance of the fin itself, and hence the corrosion resistance is important. For this reason, definitions of the shapes and number densities of constituent particles and intermetallic compounds in the microstructure described in Patent Documents 6, 7, and 8 are also linked to the technical problem characteristic of the heat radiation fin of the corrosion resistance improvement.

[Patent Document 1] JP-A-2003-82427
[Patent Document 2] JP-A-11-100628
[Patent Document 3] JP-A-10-53827
[Patent Document 4] JP-A-9-95749
[Patent Document 5] JP-A-2006-291311
[Patent Document 6] JP-A-9-78168
[Patent Document 7] JP-A-2000-119783
[Patent Document 8] JP-A-2005-139505

DISCLOSURE OF THE INVENTION

Problems to be Solved by the Invention

However, the conventional automotive radiator tubes are relatively thick. For example, in the respective Patent Documents, referring to the gages (total gages) of the brazing sheets targeted for the fatigue resistance evaluation, in Patent Document 1, the gage is 0.4 mm; in Patent Document 2, 0.25 mm; and in Patent Documents 4 and 5, 0.20 mm. In all cases, the gages are 0.20 mm or more. However, with the trend toward light-weight automobiles for enhancing the fuel economy concerned with global environmental problems, radiators have been also demanded to be reduced in weight. For this reason, a study has been conducted on still further thinning of a tube of a radiator, i.e., a brazing sheet made of aluminum alloy.

When the radiator tube is about 0.4 mm in thickness, and is relatively thick, the rigidity of the tube itself is relatively high. In contrast, when the gage of the radiator tube, mainly a multi-layered sheet such as a brazing sheet is thinned, the rigidity of the tube itself is reduced. On the other hand, the pressure of the refrigerant used is often set higher than in the related art. When the gage of the multi-layered sheet such as a brazing sheet is thinned, the synergistic effect thereof enhances the susceptibility to the fatigue fracture due to the repeated stress. Thus, the fatigue properties tend to be reduced.

When such fatigue fracture occurs, cracks (cracks, breakages) are generated in the radiator tube. In the case of a thinned radiator tube, there is a high possibility that such cracks penetrate through the tube, leading to liquid leakage of the radiator. This results in more serious damages.

However, for the fatigue properties of the radiator tube thus thinned, effective remedial measures have not been found up to now. Unless effective remedial measures are found, the radiator tube, i.e., the multi-layered sheet such as the brazing sheet made of aluminum alloy cannot be thinned. This causes a large limit on weight reduction of the radiator, and further the weight reduction of automobiles.

In view of such problems, it is an object of the present invention to provide a multi-layered sheet of aluminum alloys which can be thinned and has excellent fatigue properties such as an aluminum-alloy brazing sheet for a radiator tube of a heat exchanger.

In order to attain the object, a multi-layered sheet of aluminum alloys in accordance with a first invention of the present application is a multi-layered sheet of aluminum alloys, which includes: at least a core layer and a sacrificial layer, being cladded, to be used for a heat exchanger by brazing, wherein the core layer has an aluminum alloy composition including Si: 0.2 to 1.5 mass %, Cu: 0.2 to 1.2 mass %, Mn: 0.2 to 1.4 mass %, and Ti: 0.03 to 0.3 mass %, respectively, and including Fe: 1.0 mass % or less, and the balance being Al and inevitable impurities, and has a microstructure wherein the mean number density of dispersed particles, in which the mean value of centroid diameters observed by a 500-times SEM on the rolling plane of the core layer is 1 µm or more, is 7000 particles/mm$^2$ or less.

Further, in order to attain the object, a multi-layered sheet of aluminum alloys in accordance with a second invention of the present application is a multi-layered sheet of aluminum alloys, which includes: at least a core layer and a sacrificial layer, being cladded, to be formed into a heat exchanger by brazing, wherein the core layer has an aluminum alloy composition including, by mass %, Si: 0.2 to 1.5 mass %, Cu: 0.05 to 1.2 mass %, Mn: 0.3 to 1.8 mass %, and Ti: 0.03 to 0.3 mass %, respectively, and including Fe: 1.0 mass % or less, and the balance being Al and inevitable impurities, and has a microstructure wherein the mean number density of precipitates, in which the mean value of centroid diameters observed by a 50000-times TEM on the rolling plane in the central part in the thickness of the core layer is within the range of 0.1 to 0.5 µm, is 150 precipitates/µm$^3$ or less.

In order to attain the object, a multi-layered sheet of aluminum alloys in accordance with a third invention of the present application includes: at least a core layer and a sacrificial layer, being cladded, wherein the core layer has an aluminum alloy composition including Si: 0.2 to 1.5 mass %, Cu: 0.2 to 1.2 mass %, Mn: 0.2 to 1.4 mass %, and Ti: 0.03 to 0.3 mass %, respectively, and including Fe: 1.0 mass % or less, and the balance being Al and inevitable impurities, and has, as a microstructure after brazing process, a microstructure wherein the mean grain size in the rolling direction in the vertical section parallel with the rolling direction of the core layer is 200 μm or less, and the mean number density of dispersed particles, in which the mean value of centroid diameters observed by a 500-times SEM on the rolling plane of the core layer is 1 μm or more, is 6000 particles/mm$^2$ or less.

Further, in order to attain the object, a multi-layered sheet of aluminum alloys in accordance with a fourth invention of the present application includes: at least a core layer and a sacrificial layer, being cladded, wherein the core layer has an aluminum alloy composition including Si: 0.2 to 1.5 mass %, Cu: 0.05 to 1.2 mass %, Mn: 0.3 to 1.8 mass %, and Ti: 0.03 to 0.3 mass %, respectively, and including Fe: 1.0 mass % or less, and the balance being Al and inevitable impurities, and has, as a microstructure after brazing process, a microstructure wherein the mean grain size in the rolling direction in the vertical section parallel with the rolling direction of the core layer is 200 μm or less, and the mean number density of precipitates, in which the mean value of centroid diameters observed by a 50000-times TEM on the rolling plane in the central part in the thickness of the core layer is within the range of 0.1 to 0.5 μm, is 80 precipitates/μm$^3$ or less.

Herein, it is preferable that the core layer in each multi-layered sheet according to the first invention to fourth invention of the present application further includes the following configuration:

the one including one, or two or more of Cr: 0.03 to 0.3 mass %, Zn: 0.2 to 1.0 mass %, and Zr: 0.03 to 0.3 mass %;

the one including Mg: 0.5 mass % or less; or the one having a gage as thin as less than 0.25 mm.

Still further, it is preferable that the gage of each multi-layered sheet according to the first invention to fourth invention of the present application is as thin as less than 0.3 mm.

Advantage of the Invention

The present inventors pursued a study on the mechanism of fatigue fracture in fatigue properties when the gage of the multi-layered sheet is thinned. As a result, the findings of the present inventors indicate that there are two types of mechanisms of fatigue fracture in fatigue properties when the gage of the multi-layered sheet is thinned. Namely, the mechanisms of fatigue fracture may be such that crack initiation is predominant over the propagation (rate) of cracks (cracks, breakages) due to fatigue fracture, or may be such that crack propagation (rate) is predominant over the initiation of cracks (cracks, breakages) due to fatigue fracture. Then, the present inventors found out that the metallurgically effective means for improving the fatigue properties varies between these two mechanisms of fatigue fracture.

When the initiation of cracks is predominant over the propagation (rate) of cracks (cracks, breakages) due to fatigue fracture, the susceptibility to initiation of cracks is largely affected by the structure of the core layer of the multi-layered sheet forming the heat exchanger, i.e., the mean grain size and the mean number density of relatively coarse dispersed particles.

In contrast, when the crack propagation (rate) is predominant over the initiation of cracks (cracks, breakages) due to fatigue fracture, the propagation (rate) of fatigue fracture is largely affected by the microstructure of the core layer of the multi-layered sheet forming the heat exchanger, i.e., the mean grain size and the mean number density of relatively fine precipitates.

In accordance with the first invention and the third invention of the present application, the fatigue properties when the initiation of cracks is predominant over the propagation (rate) of cracks (cracks, breakages) due to fatigue fracture is improved. Therefore, as described above, for the microstructure of the core layer in the multi-layered sheet before brazing process as a material for heat exchanger before forming a heat exchanger, or the microstructure of the core layer in the multi-layered sheet after brazing process, the mean grain size and the mean number density of relatively coarse dispersed particles are controlled, thereby to inhibit the initiation of cracks.

In accordance with the second invention and the fourth invention of the present application, the fatigue properties when the propagation (rate) of fatigue fracture is predominant over the initiation of cracks (cracks, breakages) due to fatigue fracture is improved. Therefore, as described above, for the microstructure of the core layer in the multi-layered sheet before brazing process as a material for heat exchanger before forming a heat exchanger, or the microstructure of the core layer in the multi-layered sheet after brazing process, the mean grain size and the mean number density of relatively fine precipitates are controlled, thereby to inhibit the propagation (rate) of fatigue fracture.

In accordance with the first invention and the third invention, the mean grain size of the core layer is refined, and the mean number density of relatively coarse dispersed particles is regulated, thereby to inhibit the initiation of fatigue fracture itself. This results in an improvement of the fatigue life (fatigue properties) of the multi-layered sheet when the initiation of cracks is predominant over the propagation (rate) of cracks (cracks, breakages) due to fatigue fracture.

In accordance with the second invention and the fourth invention, the mean grain size of the core layer is refined, and the mean number density of fine precipitates is regulated, thereby to inhibit the propagation of fatigue fracture. This results in an improvement of the fatigue life (fatigue properties) of the multi-layered sheet when the propagation of fatigue fracture is predominant over the initiation of cracks due to fatigue fracture.

The term "dispersed particles" referred to in the present invention is a general term of intermetallic compounds of alloy elements such as Si, Cu, Mn, and Ti, and included elements such as Fe and Mg, or intermetallic compounds of these elements and Al, and intermetallic compounds recognizable from size thereof by microstructure observation regardless of formation elements (composition).

DESCRIPTION OF REFERENCE NUMERALS AND SIGNS

1: Multi-layered sheet of aluminum alloys for heat exchanger, 2: Core layer, 3: Sacrificial layer, 4: Braze clad layer, 10: Radiator (heat exchanger), 11: Tube (structured laminate), 12: Heat radiation fin, 13: Header

BEST MODE FOR CARRYING OUT THE INVENTION

Figure 1:
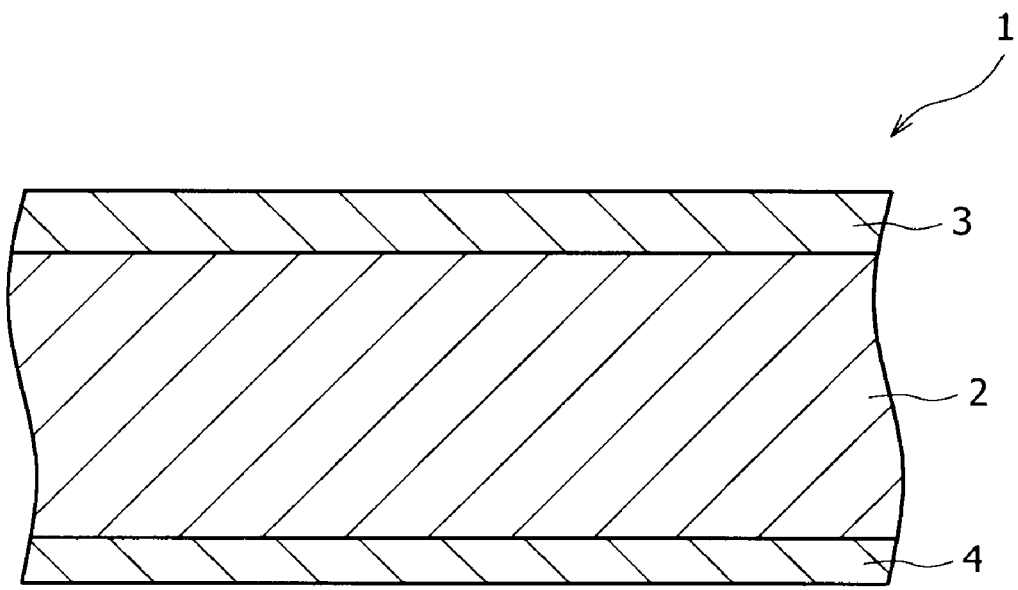
FIG. 1 is a cross-sectional view showing the inventive multi-layered sheet.
Figure 2:
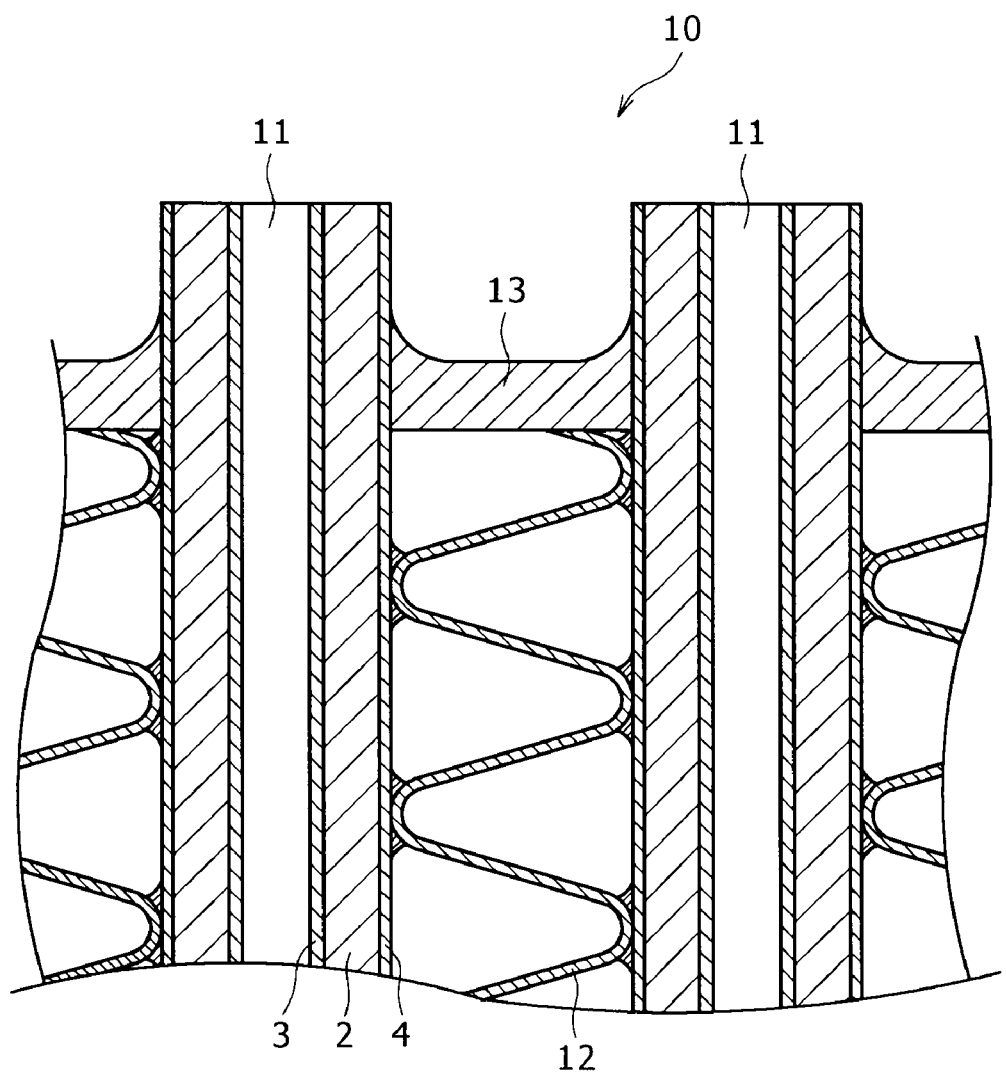
FIG. 2 is a cross-sectional view showing a heat exchanger made of aluminum alloy.
Figure 4:
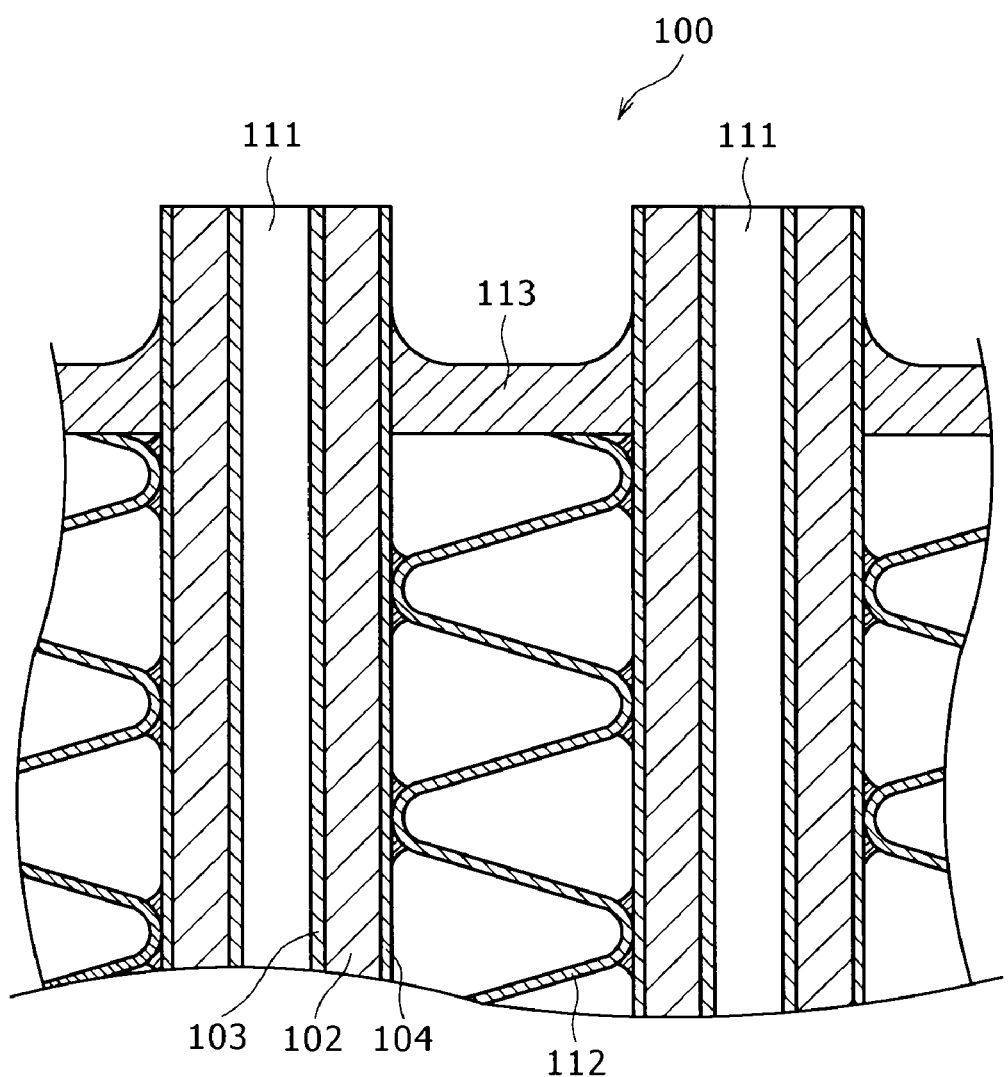
FIG. 4 is a cross-sectional view showing a general heat exchanger made of aluminum alloy.
Figure 5:
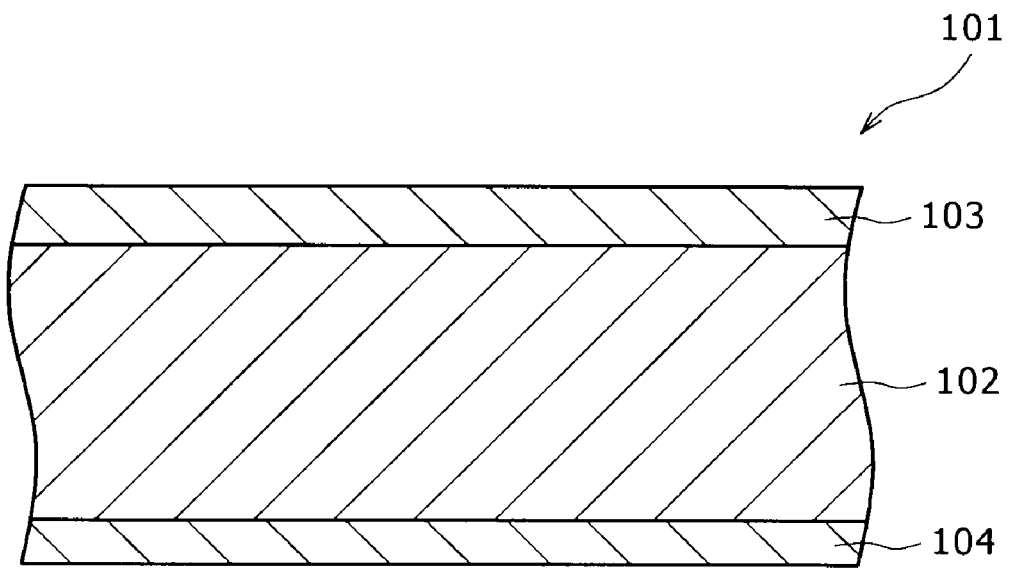
FIG. 5 is a cross-sectional view showing a general multi-layered sheet such as a brazing sheet.

Best mode for carrying out the present invention will be described by reference to FIGS. 1 and 2. FIG. 1 is a cross-sectional view of a multi-layered sheet of aluminum alloys for heat exchanger of the present invention. FIG. 2 is a cross-sectional view of an essential part of a radiator using the multi-layered sheet (tube made of aluminum alloy for heat exchanger) of FIG. 1. Incidentally, the basic configurations and structures of FIGS. 1 and 2 themselves are the same as those of FIGS. 4 and 5 described above.

(Multi-Layered Sheet)

The multi-layered sheet of the present invention is at first manufactured as a multi-layered sheet of aluminum alloys 1 shown in FIG. 1 before being assembled into a heat exchanger. The multi-layered sheet 1 is, when brazed, configured as a brazing sheet in which on one side of the core layer 2, a sacrificial layer (sheet) 3 is cladded, and on the other side thereof, a braze clad layer 4 is cladded.

The core layer 2 includes a JIS3000-series aluminum alloy having distinctive microstructure and composition described later. Whereas, on the side (the top side of FIG. 1) regularly in contact with a refrigerant, which is the inner side of the core layer 2, as a sacrifice layer (sacrifice material, lining material, coating material) 3 described above, for example, an aluminum alloy of JIS7000 series of Al—Zn composition or the like is cladded. Further, on the outer side (the bottom side of FIG. 1) of the core layer 2, for example, a braze clad layer 4 of JIS4000 series of Al—Si composition or the like is cladded.

The multi-layered sheet of the present invention such as a brazing sheet is a three-layered rolled clad material (sheet) including the core layer 2 as the center as described up to this point. When the thickness of the core layer is less than 0.25 mm, for example, 0.16 to 0.24 mm, each thickness of both the braze clad layer and the sacrificial layer is generally set at about 20 to 30 μm. However, the clad ratio varies according to the thickness (specifications of intended use) of the heat exchanger part used. These values have no restriction.

However, the thickness of the multi-layered sheet 1 such as a brazing sheet (mainly, the thickness of the core layer) is, as described above, important in weight reduction of the heat exchanger. Therefore, the thickness of the multi-layered sheet is less than 0.3 mm, and preferably about 0.16 to 0.29 mm. The thickness of the core layer is as thin as less than 0.25 mm, and preferably about 0.16 to 0.24 mm.

For the brazing sheet, on one side of a core layer (ingot) subjected to a homogenization heat treatment, a sacrificial layer (sheet) or a braze clad layer (sheet) is superposed. Thus, hot rolling is performed. Then, cold rolling, intermediate annealing, and cold rolling are successively performed, thereby to manufacture a sheet such as H14 refined material. Herein, the homogenization heat treatment may be carried out before hot rolling.

(Heat Exchanger)

The multi-layered sheet of aluminum alloys 1 such as the brazing sheet is bent in the direction of width by a forming roll or the like. Thus, the multi-layered sheet 1 is formed in a flat tube such that the sacrificial layer 3 is disposed on the tube inner side. Then, a tube in the flat tube form is formed by electro-resistance welding or the like. The flat tubular tube (structured laminate) 11 including a fluid path formed therein is shown in FIG. 2.

As shown in FIG. 2, such a flat tubular tube (structured laminate) 11 is manufactured (assembled) integrally with other members such as a corrugated heat radiation fin 12 and a header 13 into a heat exchanger such as a radiator 10 by brazing. The part in which the tube (structured laminate) 11 and the heat radiation fin 12 are integrated is also referred to as the core of the heat exchanger. Brazing is performed by heating to a temperature as high as 585 to 620° C., and preferably 590 to 600° C., equal to or higher than the solidus temperature of the braze clad layer 4. When the heating temperature is too high, more than 620° C., excessive melting, erosion, or the like occurs. As the brazing process, a flux-brazing process, a Nocolok brazing process using a non-corrosive flux, or the like is generally used.

In the heat exchanger of FIG. 2, both the ends of the flat tube (structured laminate) 11 open into the spaces formed by the headers 13 and tanks (not shown), respectively. Then, from the space on one tank side through the inside of the flat tube 11, a high-temperature refrigerant is fed to the space on the other tank side. Thus, heat exchange is performed at the parts of the tube 11 and the fin 12, so that the refrigerant reduced in temperature is circulated again.

(Microstructure of the Core Layer in the First Invention and the Third Invention of the Present Application)

First, a description will be given to the core layer in each multi-layered sheet in accordance with the first invention and the third invention of the present application.

The core layer in the multi-layered sheet before brazing process (thermal history) or the multi-layered sheet after brazing process includes a 3000-series aluminum-alloy composition.

In the first invention and the third invention of the present application, in order to enhance the fatigue fracture resistance when crack initiation due to the fatigue fracture of the core layer is predominant, the mean grain size in the rolling direction in the vertical section parallel with the rolling direction of the core layer (only for the multi-layered sheet after brazing process) is regulated. In addition, the mean number density of 1-μm or more dispersed particles (the multi-layered sheet before brazing process and the multi-layered sheet after brazing process) is regulated.

(Grains in the First Invention and the Third Invention of the Present Application)

When the mean grain size of the core layer becomes coarse in the multi-layered sheet after brazing process, or the material of a multi-layered sheet before assembly (thermal history), the fatigue fracture resistance to the fatigue such that crack initiation due to fatigue fracture is predominant is reduced. Therefore, the mean grain size in the rolling direction of the vertical section parallel with the rolling direction of the core layer in the multi-layered sheet after brazing process is reduced to 200 μm or less, and preferably 150 μm or less. Incidentally, such refinement of the core layer in the multi-layered sheet after brazing process naturally requires the following: the mean grain size of the core layer before brazing process is previously set at 200 μm or less, and preferably 150 μm or less. However, even when the mean grain size of the core layer before brazing process is regulated, the multi-layered sheet after brazing process varies (becomes coarse) in the mean grain size according to the heating conditions of the brazing treatment and the like for heat exchanger manufacturing. For this reason, even when at the stage of the material of a multi-layered sheet before brazing process, the mean grain size of the core layer is regulated, it may become coarse out of the regulation according to the heating conditions. Thus, no particular regulation was imposed at the stage of the multi-layered sheet before brazing process.

Incidentally, the term "grain size" herein referred to is for the grain size in the rolling direction in the vertical section parallel with the rolling direction (cross section of the sheet cut along the rolling direction). The grain size is observed using a 50-times optical microscope after pretreating the vertical section parallel with the rolling direction of the core layer (collected sample) in a multi-layered sheet before brazing process or a multi-layered sheet after brazing process with mechanical polishing, and electrolytic etching. At this step, the measurement is carried out with a line segment method (line intercept method) as follows: a straight line is drawn parallel with the rolling direction, and the section lengths of individual grains situated on the straight line are measured as individual grain sizes. The measurement is carried out at given ten sites to calculate the mean grain size. At this step, one measurement line length is set at 0.5 mm or more, and the number of measurement lines per visual field is 3. Thus, five visual fields are observed per measurement site. Then, the mean grain sizes successively measured for respective measurement lines are successively averaged per visual field (3 measurement lines), per 5 visual fields per one measurement site, and per 10 measurement sites. The resulting value is referred to as the mean grain size of the present invention.

(Dispersed Particles in the First Invention and the Third Invention of the Present Application)

The core layer is inevitably heated to a temperature in the vicinity of 600° C. when assembled (incorporated) into a structured laminate after brazing process. Even when the sheet goes through such thermal history, the chemical component compositions and the like specified in the present invention do not change. However, by solid solution or coarsening of dispersed particles, or the like, in the multi-layered sheet after brazing process, the number density of 1-μm or more dispersed particles specified in the present invention changes toward a smaller value than that of the multi-layered sheet before brazing process.

In the first invention and the third invention of the present application, in order to enhance the fatigue fracture resistance to the fatigue such that crack initiation due to fatigue fracture is predominant, in the core layer in the multi-layered sheet before brazing process or the multi-layered sheet after brazing process, the mean number density of the 1-μm or more dispersed particles is regulated so as not to increase more than necessary. In other words, in the heat exchanger part which has undergone thermal history at a temperature in the vicinity of 600° C. for brazing, the mean number density of the dispersed particles is regulated so as not increase more than necessary.

When the mean number density of the dispersed particles of the core layer of the multi-layered sheet after brazing process exceeds 6000 particles/mm$^2$, the fatigue fracture resistance to the fatigue such that crack initiation due to fatigue fracture is predominant is reduced. Therefore, the mean number density of dispersed particles, in which the mean value of the centroid diameters observed by the 500-times SEM on the rolling plane of the core layer of the multi-layered sheet after brazing process is 1 μm or more, is regulated at 6000 particles/mm$^2$ or less. The mean number density of the dispersed particles is set at preferably 4000 particles/mm$^2$ or less, and more preferably 2000 particles/mm$^2$ or less.

On the other hand, in order to suppress the number density of the dispersed particles of the core layer of the multi-layered sheet after brazing process, the mean number density of the dispersed particles of the core layer at the stage of the multi-layered sheet before undergoing thermal history for brazing is regulated.

Namely, unless the mean number density of the dispersed particles of the core layer at the stage of the multi-layered sheet before brazing process is set at 7000 particles/mm$^2$ or less, the mean number density of the dispersed particles of the core layer of the multi-layered sheet after brazing process cannot be assured (ensured) even when the number density of the dispersed particles is reduced (has been reduced) under thermal history for brazing. Therefore, the mean number density of dispersed particles, in which the mean value of the centroid diameters observed by a 500-times SEM of the core layer at the stage of the multi-layered sheet before brazing process is 1 μm or more, is regulated at 7000 particles/mm$^2$ or less. The mean number density of the dispersed particles is set at preferably 5000 particles/mm$^2$ or less, and more preferably 3000 particles/mm$^2$ or less.

The dispersed particles are, as described above, intermetallic compounds of alloy elements such as Si, Cu, Mn, and Ti, and included elements such as Fe and Mg, or intermetallic compounds of these elements and Al. The size and number density of dispersed particles largely affect the fatigue fracture resistance to crack propagation (rate)-predominant fatigue regardless of the formation elements (composition). Therefore, in the present invention, as described above, the size and number density are regulated.

The size and mean number density of the dispersed particles are measured in the following manner. The microstructure on the rolling plane of the core layer is observed in 10 visual fields by a SEM (scanning electron microscope) with a magnification of 500 times, followed by image analysis. As a result, it is possible to measure the mean number density (particles/mm$^2$) of dispersed particles in which the mean value of respective centroid diameters is 1 μm or more.

(Number Density Control of Dispersed Particles in the First Invention and the Third Invention of the Present Application)

The mean number density of the regulated dispersed particles is controlled in the following manner. In a soaking treatment (homogenization heat treatment), the number density of dispersed particles precipitated in the heating process in the soaking treatment is prevented from increasing more than necessary. For the number density of precipitates with these sizes, the mean number density of the dispersed particles is prevented from increasing in excess of 7000 particles/mm$^2$ at the stage of the core layered sheet before brazing process. In order to achieve this, for starting hot rolling after the alloy sheet has reached the soaking temperature, and then has been held for a given time, the time between completion of the soaking treatment and the start of hot rolling is set at 30 minutes or less. The soaking temperature is set at a temperature as relatively high as 450° C. or more, and such that melting is not caused. The soaking temperature of less than 450° C. does not produce the effect of homogenization (soaking). However, the soaking treatment on the ingot of the core layered sheet is performed at a relatively high temperature. Therefore, the soaking treatment may be unable to be performed with the sacrificial layer or the braze clad layer superposed on the core layer according to the melting point of the sacrificial layer or the braze clad layer. In such a case, preferably, on only the ingot of the core layered sheet, the relatively high-temperature soaking treatment is performed. Then, after superposing the multi-layered sheet, a relatively low-temperature soaking treatment or a reheat treatment for hot rolling is performed.

(Microstructure of the Core Layer in the Second Invention and the Fourth Invention of the Present Application)

Then, a description will be given to the core layer in each multi-layered sheet in accordance with the second invention and the fourth invention of the present application.

Herein, the core layer in a multi-layered sheet before brazing process or a multi-layered sheet after brazing process (thermal history) includes a 3000-series aluminum alloy composition as with the first invention and the third invention of the present application.

In the second invention and the fourth invention of the present application, the fatigue fracture resistance to the fatigue such that crack propagation (rate) due to the fatigue fracture is predominant of the core layer is enhanced. In order to achieve this, there are regulated the mean grain size in the rolling direction in the vertical section parallel with the rolling direction of the core layer (regulated on only the multi-layered sheet after brazing process) and, the mean number density of precipitates in which the mean value of the centroid diameters observed by a 50000-times TEM on the rolling plane in the central part in the thickness of the core layer is within the range of 0.1 to 0.5 μm (a multi-layered sheet before brazing process and a multi-layered sheet after brazing process).

(Grains in the Second Invention and the Fourth Invention of the Present Application)

As described above, when the mean grain size of the core layer as the multi-layered sheet after brazing process, or the multi-layered sheet before assembly (thermal history) becomes coarse, the fatigue fracture resistance to the fatigue such that crack initiation due to fatigue fracture is predominant is reduced. Therefore, the mean grain size in the rolling direction of the vertical section parallel with the rolling direction of the core layer in the multi-layered sheet after brazing process is reduced to 200 μm or less, and preferably 150 μm or less. Incidentally, such refinement of the core layer in the multi-layered sheet after brazing process naturally requires the following: the mean grain size of the core layer of the multi-layered sheet before brazing process is previously set at 200 μm or less, and preferably 150 μm or less. However, even when the mean grain size of the core layer of the multi-layered sheet before brazing process is regulated, the multi-layered sheet after brazing process varies (becomes coarse) in mean grain size according to the heating conditions of the brazing treatment and the like for heat exchanger manufacturing. For this reason, even when at the stage of the multi-layered sheet before brazing process, the mean grain size of the core layer is regulated, it may become coarse out of the regulation according to the heating conditions. Thus, no particular regulation was imposed at the stage of the multi-layered sheet before brazing process.

Incidentally, the term "grain size" herein referred to is for the grain size in the rolling direction in the vertical section parallel with the rolling direction (cross section of the sheet cut along the rolling direction). The grain size is observed using a 50-times optical microscope after pretreating the vertical section parallel with the rolling direction of the core layer (collected sample) in a multi-layered sheet before brazing process or a multi-layered sheet after brazing process with mechanical polishing, and electrolytic etching. At this step, the measurement is carried out with a line segment method (line intercept method) as follows: a straight line is drawn parallel with the rolling direction, and the section lengths of individual grains situated on the straight line are measured as individual grain sizes. The measurement is carried out at given ten sites to calculate the mean grain size. At this step, one measurement line length is set at 0.5 mm or more, and the number of measurement lines per visual field is 3. Thus, five visual fields are observed per measurement site. Then, the mean grain sizes successively measured for respective measurement lines are successively averaged per visual field (3 measurement lines), per 5 visual fields per one measurement site, and per 10 measurement sites. The resulting value is referred to as the mean grain size, in the present invention.

(Precipitates in the Second Invention and the Fourth Invention of the Present Application)

The core layer is, even a brazing sheet, inevitably heated to a temperature in the vicinity of 600° C. when assembled (incorporated) into a structured laminate after brazing process. Even when the sheet goes through such thermal history, the chemical component compositions and the like regulated in the present invention do not change. However, the mean number density of precipitates within the range of 0.1 to 0.5 μm regulated in the present invention changes toward a smaller value than that of the material of a multi-layered sheet by solid solution or coarsening in the multi-layered sheet after brazing process.

In the second invention and the fourth invention of the present application, in order to enhance the fatigue fracture resistance to the fatigue such that crack propagation (rate) due to fatigue fracture is predominant, in the core layer in the material of a multi-layered sheet or the multi-layered sheet after brazing process, the mean number density of the precipitates is regulated. In other words, the mean number density of the precipitates as the heat exchanger part which has undergone thermal history at a temperature in the vicinity of 600° C. for brazing is regulated.

When the mean number density of the precipitates of the core layer of the multi-layered sheet after brazing process exceeds 80 precipitates/μm$^3$, the fatigue fracture resistance to crack propagation (rate)-predominant fatigue is reduced. Therefore, the mean number density of precipitates, in which the mean value of the centroid diameters observed by the 50000-times TEM on the rolling plane in the central part in the thickness of the core layer of the multi-layered sheet after brazing process is within the range of 0.1 to 0.5 μm, is set at 80 precipitates/μm$^3$ or less. Further, preferably, the mean number density of the precipitates with a size such that the mean value of the centroid diameters is within the range of 0.2 to 0.5 μm is set at 70 precipitates/μm$^3$ or less.

On the other hand, in order to suppress the number density of the dispersed particles of the core layer of the multi-layered sheet after brazing process, the mean number density of the precipitates of the core layer at the stage of the material of a multi-layered sheet before undergoing thermal history for brazing is regulated.

Namely, unless the mean number density of the precipitates of the core layer at the stage of the material of a multi-layered sheet is set at 150 μm$^3$ or less, the mean number density of the precipitates of the core layer of the multi-layered sheet after brazing process cannot be assured (ensured) even when the number density of the precipitates is reduced (has been reduced) under thermal history for brazing. Therefore, in the present invention, the mean number density of precipitates with a size such that the mean value of the centroid diameters observed by a 50000-times TEM on the rolling plane in the central part in the thickness of the core layer at the stage of the material of a multi-layered sheet is within the range of 0.1 to 0.5 μm is set at 150 μm$^3$ or less. Further, preferably, the mean number density of the precipitates with a size such that the mean value of the centroid diameters is within the range of 0.2 to 0.5 μm is set at 120 precipitates/μm$^3$ or less.

The precipitates are, as described above, intermetallic compounds of alloy elements such as Si, Cu, Mn, and Ti, or included elements such as Fe and Mg, or intermetallic compounds of these elements and Al. Then, the reason why the size and mean number density are regulated as described above in the present invention is as follows. For the precipitates, the size and mean number density thereof largely affects the fatigue fracture resistance to crack propagation (rate)-predominant fatigue regardless of the formation elements (composition).

The size and mean number density of the precipitates are measured in the following manner. The microstructure on the rolling plane in the central part in the thickness of the core layer is observed in 10 visual fields by a TEM (transmission electron microscope) with a magnification of 50000 times, followed by image analysis. As a result, it is possible to measure the mean number density (precipitates/$\mu m^3$) of precipitates in which the mean value of respective centroid diameters is within the range of 0.1 to 0.5 $\mu m$.

(Number Density Control of Precipitates in the Second Invention and the Fourth Invention of the Present Application)

The mean number density of the regulated precipitates is controlled in the following manner. In a soaking treatment (homogenization heat treatment), the number density of precipitates crystallized in the casting process is reduced. The number density of precipitates with these sizes is reduced to 50 precipitates/$\mu m^3$ or less at the stage of the core layer (ingot). In order to achieve this, the soaking temperature is controlled, and the soaking temperature is set at a temperature as relatively high as 500° C. or more, and such that melting is not caused. When the soaking temperature is less than 500° C., the number density of precipitates crystallized in the casting process cannot be reduced. However, the soaking treatment on the ingot of the core layer is performed at a relatively high temperature. Therefore, the soaking treatment may be unable to be performed with the sacrificial layer or the braze clad layer superposed on the core layer according to the melting point of the sacrificial layer or the braze clad layer. In such a case, preferably, on only of the ingot of the core layer, the relatively high-temperature soaking treatment is performed. Then, after superposing the multi-layered sheet, a relatively low-temperature soaking treatment or a reheat treatment for hot rolling is performed.

(Aluminum Alloy Composition of the Present Application)

Below, a description will be given to the aluminum alloy composition of each part forming each multi-layered sheet in accordance with the first to fourth inventions of the present application (which may be hereinafter generically referred to as the present invention). As described above, the core layer 2 includes a 3000-series aluminum alloy composition. However, the core layer 2 is required to have various characteristics such as formability, brazing property, or weldability, strength, and corrosion resistance not only for the purpose of implementing the microstructure regulated in the present invention as the parts for heat exchanger such as tube material and header material, but also for other purposes.

For this reason, the core layer in accordance with the present invention has an aluminum alloy composition which includes Si: 0.2 to 1.5 mass %, Cu: 0.2 to 1.2 mass %, Mn: 0.2 to 1.4 mass %, and Ti: 0.03 to 0.3 mass %, respectively, and includes Fe: 1.0 mass % or less, and the balance being Al and inevitable impurities.

Herein, it is preferable that the aluminum alloy sheet further includes one, or two or more of Cr: 0.03 to 0.3 mass %, Zn: 0.2 to 1.0%, and Zr: 0.03 to 0.3 mass %. Further, it is preferable that the aluminum alloy sheet includes Mg in an amount of 0.5 mass % or less.

Fe, Mg and other elements than the foregoing elements are basically impurities. However, these elements are mixed therein when as the dissolution material, not only a high-purity aluminum unwrought products, but also 6000-series alloys and other aluminum alloy scrap materials, low-purity unwrought products, or the like are used as the dissolution raw materials from the viewpoint of recycle of the aluminum alloy sheet. Then, reduction of these elements to, for example, identification limit or lower itself results in an increase in cost. Thus, a certain degree of inclusion is required to be allowed. Therefore, inclusion within such a range as not to inhibit the objects and effects of the present invention is allowed. It does not matter if, for example, elements other than those described above such as B are included so long as they are each included in an amount of 0.05% or less.

Si: 0.2 to 1.5 Mass %

Si forms an intermetallic compound with Fe, and enhances the strength of the core layer. In order to ensure the necessary strength as the material of a multi-layered sheet or the multi-layered sheet after brazing process, the Si content is required to be 0.2 mass % or more. On the other hand, when the Si content is too large, in the core layer, a coarse compound is formed. This results in reduction of the corrosion resistance of the material of the multi-layered sheet or the multi-layered sheet after brazing process. For this reason, the Si content is set at 1.5 mass % or less. Therefore, the Si content range is set at the range of 0.2 to 1.5 mass %.

Cu: 0.2 to 1.2 Mass %

Cu is present in a solid solution state in the aluminum alloy sheet, and improves the strength of the core layer. For this reason, in order to ensure the necessary strength as the material of a multi-layered sheet or the multi-layered sheet after brazing process, the Cu content is required to be 0.2 mass % or more. On the other hand, when the Cu content is too large, the corrosion resistance as the material of the multi-layered sheet or the multi-layered sheet after brazing process is reduced. For this reason, the Cu content is set at 1.2 mass % or less. Therefore, the Cu content range is set at the range of 0.2 to 1.2 mass %.

Mn: 0.2 to 1.4 Mass %

Mn is an element for distributing intermetallic compounds such as the regulated dispersed particles in the aluminum alloy sheet, and improving the strength without reducing the corrosion resistance of the core layer. Further, Mn also has an effect of reducing the crystal grain size, and enhancing the vibration fatigue resistance and the fatigue fracture resistance to the fatigue such that crack initiation due to fatigue fracture is predominant. For this reason, in order to ensure the necessary strength as the multi-layered sheet or the multi-layered sheet after brazing process, and enhancing the fatigue fracture resistance, Mn is included therein in an amount of 0.2 mass % or more as the lower limit.

On the other hand, when the Mn content is too large, the number density of the dispersed particles is rather increased more than regulation. This results in reduction of the vibration fatigue resistance and the fatigue fracture resistance to the fatigue such that crack initiation due to fatigue fracture is predominant. Further, the formability of the layer is reduced, so that the multi-layered sheet of aluminum alloys may be cracked during processing such as assembly into a component shape. For this reason, the Mn content is set at 1.4 mass % or less. Therefore, the Mn content range is set at the range of 0.2 to 1.4 mass %. Further, the Mn content range is preferably set at 0.2 mass % or more and 1.0 mass % or less, and more preferably 0.2 mass % or more and 0.6 mass % or less.

Ti: 0.03 to 0.3 Mass %

Ti has a function of forming fine intermetallic compounds in the aluminum alloy sheet, and improving the corrosion resistance of the core layer. For this reason, in order to ensure the necessary corrosion resistance as the multi-layered sheet or the multi-layered sheet after brazing process, the Ti content is required to be 0.03% or more. On the other hand, when the Ti content is too large, the formability of the multi-layered sheet of aluminum alloys is reduced, so that the multi-layered sheet of aluminum alloys may be cracked during processing such as assembly into a component shape. For this reason, the Ti content is set at 0.3% or less. Therefore, the Ti content range is set at the range of 0.03 to 0.3 mass %.

Fe: 1.0 Mass % or Less

Fe is inevitably included in the core layer so long as scraps are used as aluminum alloy dissolution raw materials. As described above, Fe forms an intermetallic compound with Si, and enhances the strength of the core layer. In addition, Fe has an effect of reducing the crystal grain size, and further enhancing the brazing property of the core layer. However, when the Fe content is too large, the corrosion resistance of the core layer is remarkably reduced. For this reason, the Fe content is regulated at 1.0 mass % or less.

Mg: 0.5 Mass % or Less

Mg enhances the strength of the core layer. However, when the Mg content is large, in the Nocolok brazing process using a fluoride series flux, or the like, the brazing property is reduced. For this reason, for a heat exchanger by brazing conditions such that the brazing property is reduced by Mg, the Mg content is preferably regulated to 0.5% or less.

One, or two or more of Cr: 0.03 to 0.3 mass %, Zn: 0.2 to 1.0 mass %, and Zr: 0.03 to 0.3 mass %

Cr, Zn, and Zr have an effect of enhancing the vibration fatigue resistance, and the fatigue properties such that crack initiation due to fatigue fracture is predominant of the core layer. When this effect is desired to be exerted, one, or two or more of Cr: 0.03 to 0.3 mass %, Zn: 0.2 to 1.0 mass %, Zr: 0.03 to 0.3 mass % are included in these ranges.

(Braze Clad Layer of the Present Invention)

For the braze clad layer 4 to be cladded on the core layer 2, there can be used known brazing material aluminum alloys such as conventionally widely used 4000-series Al—Si series alloy brazing materials such as JIS 4043, 4045, 4047, and the like. The braze clad layer is formed as a brazing sheet on one side of which the sacrificial layer 3 is cladded, and on the other side of which the braze clad layer 4 is cladded.

(Sacrificial Layer of the Present Invention)

For the sacrificial layer 3 to be cladded on the core layer 2, there can be used known sacrificial layer including Zn such as 7000-series aluminum alloys including conventionally widely used Al-1 mass % Zn-composition JIS7072. Such sacrificial layer are essential for automotive heat exchangers in which cooling water is present on the tube inner surface side. Namely, the sacrificial layer becomes essential for ensuring the corrosion protection, anti-corrosion properties against the corrosiveness of the inner surface side of the tube on which cooling water is present.

EXAMPLES

First Experimental Examples

Examples in Accordance with the First Invention and the Third Invention of the Present Application Below, by way of examples, the first invention and the third invention of the present application will be described more specifically.

Multi-layered sheets (brazing sheets) 1 having aluminum alloy core layers 2 with compositions A to R shown in Table 1 were manufactured. Thus, the microstructure of each core layer 2 was examined. Further, each multi-layered sheet 1 was subjected to brazing process, and holding to a temperature of 600° C. for 3 minutes, simulating brazing. Then, the multi-layered sheet 1 was cooled at a mean cooling rate of 100° C./min. Thus, the structure of the core layer portion of the multi-layered sheet after brazing process was examined. These results are shown in Table 2. Further, the mechanical properties and the fatigue properties of the multi-layered sheets after brazing process were measured and evaluated. These results are shown in Table 3.

(Manufacturing of Multi-Layered Sheet)

The multi-layered sheets were manufactured in the following manner. The 3000-series aluminum alloy compositions with compositions A to R shown in Table 1 were dissolved, and cast to manufacture aluminum alloy core layer ingots. On one side of each core layer ingot, a JIS7072 aluminum alloy sheet including Al-1 mass % Zn composition was cladded as a sacrificial layer. On the other side thereof, a JIS4045 aluminum alloy sheet including an Al-10 mass % Si composition was cladded as a braze clad layer. Then, for the clad sheets, as shown in Table 2, the soaking temperature, and the time between completion of soaking and start of hot rolling was variously changed in all the examples. Thus, the number density of the dispersed particles was controlled. Further, the clad sheets were hot-rolled. Then, further, the clad sheets were cold-rolled while being appropriately subjected to intermediate annealing, resulting in multi-layered sheets (brazing sheets) of H14 refined materials.

In common throughout respective examples, the thickness of the core layer of the multi-layered sheet is 0.18 mm. Both the thicknesses of the braze clad layer and the sacrificial layer respectively stacked on respective sides of the core layer were within the range of 20 to 30 μm.

(Microstructure)

Using the measurement methods, respectively, the microstructures of the core layer portion of each multi-layered sheet which is the cold-rolled clad sheet, and the core layer portion of each multi-layered sheet after the heating were observed. Thus, the mean grain size (μm) in the rolling direction in the vertical section parallel with the rolling direction, and the mean number density (particles/mm$^2$) of dispersed particles in which the mean value of centroid diameters observed by a 500-times SEM on the rolling plane of the core layer part is 1 μm or more were measured. These results are shown in Table 2. Herein, the mean grain size of the core layer of the multi-layered sheet before brazing process which is the material is not shown in Table 2. However, the mean grain size scarcely changes with brazing process for the short time. Therefore, the mean grain size was roughly the same as the mean grain size of the core layer in the multi-layered sheet after brazing process shown in Table 2.

(Mechanical Properties)

The tensile test of each multi-layered sheet after the heating was performed to measure the tensile strength (MPa), 0.2% proof stress (MPa), elongation (%), reduction of area (%), and n value, respectively. These results are shown in Table 3. For the test conditions, a JIS Z2201 No. 5 specimen (25 mm×50 mmGL×gage) perpendicular to the rolling direction was collected from each multi-layered sheet. Thus, the tensile test was performed. The tensile test was performed at room temperature of 20° C. according to JIS Z2241 (1980) (metal material tensile testing method). Further, the crosshead speed was 5 mm/min, and the test was performed at a constant speed until the specimen was fractured. The n value was determined in the following manner. From the endpoint of the yield elongation, the true stress and the true strain are calculated, and plotted on a logarithmic scale with strain as abscissa and stress as ordinate. Thus, the gradient of the straight line represented by measurement points was measured.

(Fatigue Properties)

Figure 3:
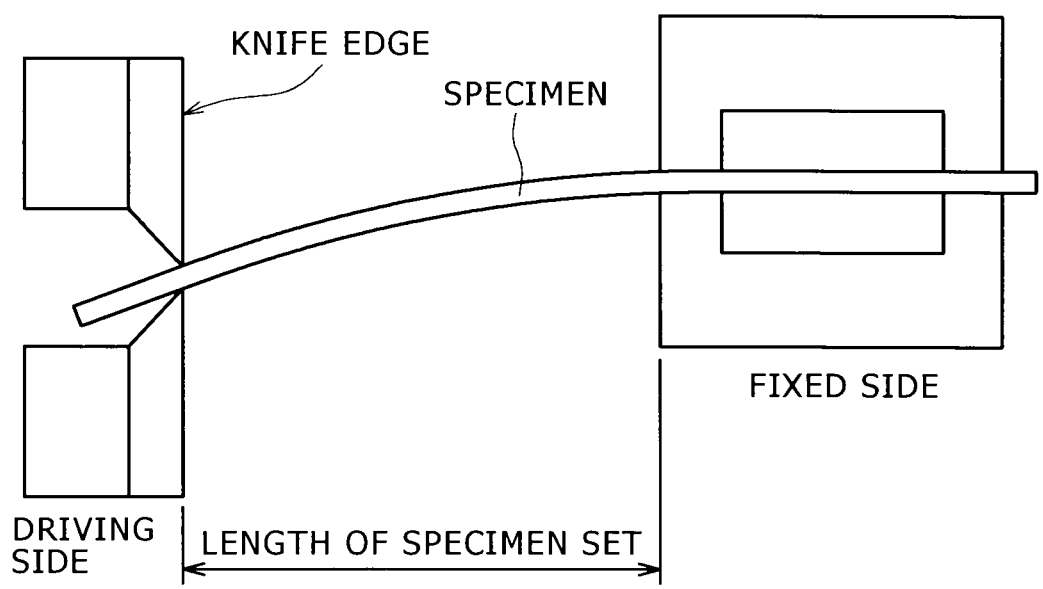
FIG. 3 is an illustrative view showing a bending fatigue test.

Evaluation of the fatigue properties of each multi-layered sheet after the heating was carried out at ordinary temperatures by means of a known pulsating plane bending fatigue tester shown in FIG. 3, also described in the Patent Document 5. Namely, from each multi-layered sheet after the heating, a 10 mm×60 mm×gage specimen was cut out so as to be in parallel with the rolling direction, resulting in manufacturing of a specimen. One end of the specimen was attached to the fixed side of the pulsating plane bending fatigue tester as shown in the right-hand side of FIG. 3. Then, the other end of the specimen was interposed between knife edges on the driving side as shown in the left-hand side of FIG. 3.

In the bending fatigue test, by moving the positions of the knife edges, plane bending of the specimen was repeatedly performed so as to make the pulsating width constant (5 mm in the vertical direction of FIG. 3) while changing the specimen set length. At this step, in order to reproduce the crack initiation-predominant fatigue regarded as the problem in the present invention, the additional bending stress was adjusted in specimen set length so that the strain amount of the fractured site was as relatively high as about 0.005 at maximum. Under such conditions, the number of repetitions of plane bending until each specimen was fractured was determined. These results are shown in Table 3.

Incidentally, for the strain amount of the fractured site, a strain gage cannot be directly bonded to the fractured site. Therefore, strain gages are bonded at two, or three prescribed positions a little apart from the fractured site. Thus, the strain amount of the fractured site is estimated from extrapolation of the strain amount of the fractured site from the strain value of each strain gage at each specimen length. Based on this, the load stress, namely, the specimen set length was adjusted.

(Fractured Surface Observation)

Further, the rolling plane in the vicinity of the fatigue fracture of each multi-layered sheet (after brazing process) after the bending fatigue test was observed by a 100-times SEM. Thus, the mechanism of fatigue fracture was examined from the degree of crack initiation. When the degree of crack initiation is relatively high, the fatigue is the crack initiation-predominant fatigue regarded as the problem in the present invention. When the degree of crack initiation is relatively low, the fatigue is the crack propagation-predominant fatigue. Therefore, with the same kind of aluminum alloy sheets, intentionally (typically), crack initiation-predominant fatigue, and crack propagation-predominant fatigue are formed separately. From the samples serving as the reference, the difference in degree of crack initiation is previously examined. Then, as compared with the samples serving as the reference, when the degree of crack initiation was relative high, the fatigue was judged as the crack propagation-predominant fatigue. When the degree of crack initiation was relatively low, the fatigue was judged as the crack propagation-predominant fatigue. These results are shown in Table 3.

TABLE 1

| Classification | Code | Composition of the core layer of aluminum alloys (mass %, balance Al) | | | | | | | | |
|---|---|---|---|---|---|---|---|---|---|---|
| | | Si | Fe | Cu | Mn | Mg | Cr | Zn | Ti | Zr |
| Inventive Example | A | 0.2 | 0.1 | 0.7 | 1.4 | — | — | — | 0.1 | — |
| | B | 0.8 | 0.1 | 0.7 | 1.4 | — | — | — | 0.1 | — |
| | C | 1.2 | 0.1 | 0.7 | 1.4 | — | — | — | 0.1 | — |
| | D | 1.5 | 0.1 | 0.7 | 1.0 | — | — | — | 0.1 | — |
| | E | 0.8 | 0.1 | 0.2 | 0.5 | — | — | — | 0.1 | — |
| | F | 0.8 | 0.1 | 0.5 | 1.4 | — | — | — | 0.1 | — |
| | G | 0.8 | 0.1 | 1.1 | 1.4 | — | — | — | 0.1 | — |
| | H | 0.8 | 1.0 | 1.2 | 0.8 | — | — | — | 0.1 | — |
| | I | 0.8 | 0.1 | 0.7 | 1.4 | 0.5 | — | — | 0.1 | — |
| | J | 0.8 | 0.1 | 0.7 | 0.6 | 0.3 | — | 0.2 | 0.1 | — |
| | K | 0.8 | 0.1 | 0.7 | 0.3 | — | — | — | 0.03 | — |
| | L | 0.8 | 0.1 | 0.7 | 1.2 | 0.3 | 0.03 | — | 0.3 | 0.2 |
| | M | 0.8 | 0.1 | 0.7 | 1.4 | — | 0.3 | 0.6 | 0.1 | 0.3 |
| Comparative Example | N | 1.6 | 0.1 | 0.7 | 1.4 | — | — | — | 0.1 | — |
| | O | 0.8 | 0.1 | 1.3 | 1.4 | — | — | — | 0.1 | — |
| | P | 0.8 | 0.1 | 0.7 | 1.9 | — | — | — | 0.1 | — |
| | Q | 0.8 | 0.1 | 0.7 | 1.4 | — | — | — | 0.4 | — |
| | R | 0.8 | 1.2 | 0.7 | 1.4 | — | — | — | 0.1 | — |

* In the description of the content, "—" represents the identification limit or lower.

TABLE 2

| | | | Multi-layered sheet of aluminum alloys before brazing process | | | Multi-layered sheet of aluminum alloys after brazing process | |
|---|---|---|---|---|---|---|---|
| | | | Soaking conditions | | | | |
| | | | | Time taken | Core layer | Core layer | |
| Classification | Code | Core layer composition | Soaking temperature °C. | until start of hot rolling (min) | Dispersed particles mean number density particles/mm$^2$ | Dispersed particles mean number density particles/mm$^2$ | Mean crystal grain size μm |
| Inventive Example | 1 | A | 500 | 19 | 4513 | 3747 | 88 |
| | 2 | B | 480 | 6 | 3794 | 2956 | 112 |
| | 3 | C | 490 | 24 | 3117 | 2070 | 139 |
| | 4 | D | 470 | 29 | 2822 | 1664 | 96 |

TABLE 2-continued

| | | | Multi-layered sheet of aluminum alloys before brazing process | | | Multi-layered sheet of aluminum alloys after brazing process | |
|---|---|---|---|---|---|---|---|
| | | | Soaking conditions | | | Core layer | |
| | | | Soaking temperature ° C. | Time taken until start of hot rolling (min) | Core layer Dispersed particles mean number density particles/mm² | Dispersed particles mean number density particles/mm² | Mean crystal grain size μm |
| Classification | Code | Core layer composition | | | | | |
| | 5 | E | 520 | 11 | 2278 | 1340 | 127 |
| | 6 | F | 460 | 23 | 3025 | 1921 | 104 |
| | 7 | G | 540 | 18 | 3461 | 2387 | 91 |
| | 8 | H | 510 | 27 | 2619 | 1845 | 89 |
| | 9 | I | 530 | 21 | 3036 | 2209 | 143 |
| | 10 | J | 480 | 17 | 2276 | 1587 | 167 |
| | 11 | K | 460 | 25 | 2431 | 1673 | 183 |
| | 12 | L | 470 | 21 | 2872 | 2183 | 116 |
| | 13 | M | 540 | 14 | 5022 | 4381 | 59 |
| Comparative Example | 14 | B | 480 | 49 | 7148 | 6325 | 132 |
| | 15 | B | 400 | 22 | 7063 | 6197 | 79 |
| | 16 | N | 470 | 14 | 7436 | 6732 | 93 |
| | 17 | O | 500 | 23 | 7109 | 6086 | 85 |
| | 18 | P | 490 | 19 | 7261 | 6488 | 62 |
| | 19 | Q | 460 | 16 | 7038 | 6013 | 89 |
| | 20 | R | 510 | 39 | 7874 | 7019 | 66 |

TABLE 3

| | | | Multi-layered sheet of aluminum alloys after brazing process | | | | | | | |
|---|---|---|---|---|---|---|---|---|---|---|
| | | | Mechanical properties | | | | | Fatigue properties | | |
| | | | | | | | | Degree of | | |
| Classification | Code | Core layer composition | Tensile strength MPa | 0.2% proof stress MPa | Elongation % | Reduction of area % | n value | Number of repetitions of bending | fractured surface crack initiation | Crack initiation predominant |
| Inventive Example | 1 | A | 176 | 58 | 13 | 88 | 0.33 | 65283 | High | ○ |
| | 2 | B | 174 | 57 | 13 | 89 | 0.33 | 81869 | High | ○ |
| | 3 | C | 173 | 56 | 12 | 93 | 0.37 | 97301 | High | ○ |
| | 4 | D | 160 | 49 | 16 | 95 | 0.41 | 176958 | High | ○ |
| | 5 | E | 157 | 46 | 18 | 96 | 0.43 | 198054 | High | ○ |
| | 6 | F | 149 | 42 | 16 | 94 | 0.38 | 139761 | High | ○ |
| | 7 | G | 183 | 72 | 15 | 91 | 0.36 | 93149 | High | ○ |
| | 8 | H | 161 | 52 | 13 | 94 | 0.39 | 157826 | High | ○ |
| | 9 | I | 178 | 60 | 16 | 88 | 0.35 | 96057 | High | ○ |
| | 10 | J | 207 | 88 | 15 | 84 | 0.35 | 193817 | High | ○ |
| | 11 | K | 187 | 81 | 15 | 86 | 0.34 | 223231 | High | ○ |
| | 12 | L | 180 | 61 | 15 | 92 | 0.33 | 96583 | High | ○ |
| | 13 | M | 177 | 62 | 17 | 86 | 0.33 | 61077 | High | ○ |
| Comparative Example | 14 | B | 178 | 60 | 12 | 71 | 0.30 | 49095 | High | ○ |
| | 15 | B | 177 | 60 | 11 | 72 | 0.30 | 49694 | High | ○ |
| | 16 | N | 173 | 56 | 10 | 69 | 0.29 | 41759 | High | ○ |
| | 17 | O | 181 | 62 | 11 | 73 | 0.30 | 50731 | High | ○ |
| | 18 | P | 174 | 57 | 15 | 84 | 0.30 | 46524 | High | ○ |
| | 19 | Q | 176 | 55 | 12 | 79 | 0.31 | 52408 | High | ○ |
| | 20 | R | 203 | 91 | 9 | 69 | 0.27 | 40587 | High | ○ |

As shown in Table 2, for Inventive Examples 1 to 13, the core layer falls within the inventive component composition range, and is manufactured within the preferred soaking condition range. For this reason, as shown in Table 2, the core layer of the multi-layered sheet (brazing sheet) has a microstructure wherein the mean number density of dispersed particles, in which the mean value of centroid diameters observed by a 500-times SEM on the surface layer of the rolling plane is 1 μm or more, is 7000 particles/mm² or less. Therefore, even as a multi-layered sheet after brazing process (brazing sheet), the core layer has a microstructure wherein the mean grain size in the rolling direction in the vertical section parallel with the rolling direction is 200 μm or less; and wherein the mean number density of dispersed particles, in which the mean value of centroid diameters observed by a 500-times SEM on the surface layer of the rolling plane is 1 μm or more, is 6000 particles/mm² or less.

As a result, as shown in Table 3, the Inventive Examples 1 to 13 each have a prescribed strength, and further are excellent in properties such as reduction of area and n value, are large in number of repetitions until fracture of the brazing-equivalent material in the bending fatigue test, and are long in fatigue life. Therefore, from the fractured surface adjacent surface observation result that the degree of crack initiation is high, it is indicated that the Inventive Examples 1 to 13 are excellent in crack initiation-predominant fatigue regarded as the problem in the first invention and the third invention of the present application.

In other words, it is indicated as follows: in comparison with respective comparative examples described later, as in the Inventive Examples 1 to 13, when the reduction of area is 85% or more, and the n value is 0.32 or more, the sample is excellent in crack initiation-predominant fatigue regarded as the problem in the first invention and the third invention of the present application.

In contrast, for Comparative Examples 14 and 15, the core layer falls within the inventive component composition range (B). However, for Comparative Example 14, the time until start of hot rolling is too long. For Comparative Example 15, the soaking temperature is too low. For this reason, as shown in Table 2, in the core layer of the multi-layered sheet, the mean number density of the precipitates exceeds 7000 particles/mm$^2$. Therefore, also in each multi-layered sheet after the heating, the mean grain size of the core layer is 150 μm or less, but the mean number density of the dispersed particles exceeds 6000 particles/mm$^2$.

As a result, as shown in Table 3, Comparative Examples 14 and 15 each have a prescribed strength. However, the reduction of area is less than 85%, and the n value is less than 0.32. Thus, the samples are inferior in these properties. For this reason, the number of repetitions until fracture of the brazed material in the bending fatigue test is small, and the fatigue life is short. Therefore, from the observation result that the degree of crack initiation in the fractured site adjacent rolled surface is high, it is indicated that Comparative Examples 14 and 15 are inferior in crack initiation-predominant fatigue.

For Comparative Examples 16 to 20, the core layers have component compositions N, O, P, Q, and R (Table 1) departing from the inventive scope. Namely, the contents of Si, Cu, Mn, Ti, and Fe exceed their respective upper limits, and are too high. As a result, each multi-layered sheet after the heating is small in number of repetitions until fracture of the brazed material in the bending fatigue test, and is short in fatigue life.

The results of Examples up to this point support the critical significance or effects of each requirement of the first invention and the third invention of the present application for the multi-layered sheet for heat exchanger or the multi-layered sheet after brazing process to be excellent in mechanical properties and crack initiation-predominant fatigue.

Second Experimental Examples

Examples in Accordance with the Second Invention and the Fourth Invention of the Present Application Below, by way of Examples, the second invention and the fourth invention of the present application will be more specifically described.

Multi-layered sheets (brazing sheets) 1 having aluminum-alloy core layers 2 of compositions a to r shown in Table 4 were manufactured. Then, each microstructure of the core layer 2 portions was examined. Further, each multi-layered sheet 1 was subjected to brazing process, and holding to a temperature of 600° C. for 3 minutes, simulating brazing. Then, the multi-layered sheet 1 was cooled at a mean cooling rate of 100° C./min. Thus, the structure of the core layer portion of the multi-layered sheet after brazing process was examined. These results are shown in Table 5. Further, the mechanical properties and the fatigue properties of the multi-layered sheet s after brazing process were measured and evaluated. These results are shown in Table 6.

(Manufacturing of Multi-Layered Sheet)

The multi-layered sheets were manufactured in the following manner. The 3000-series aluminum alloy compositions with compositions a to r shown in Table 4 were dissolved, and cast to manufacture ingots of aluminum alloy core layer. For only the ingots of the core layer, the soaking temperature was variously changed as shown in Table 5 to control the number density of precipitates (the soaking temperature shown in Table 5 is the soaking treatment temperature of only the ingot of the core layer). Further, On one side of each ingot of the core layer, a JIS7072 aluminum alloy sheet including Al-1 mass % Zn composition was cladded as a sacrificial layer. On the other side thereof, a JIS4045 aluminum alloy sheet including an Al-10 mass % Si composition was cladded as a blaze clad layer. Then, the clad sheets were reheated to the range of 500 to 530° C. to be hot-rolled. At this step, the time between completion of reheating and start of hot rolling was set constant at 30 minutes. Then, further, the clad sheets were cold-rolled while being appropriately subjected to intermediate annealing, resulting in multi-layered sheets (brazing sheets) of H14 refined materials.

In common throughout respective examples, the thickness of the core layer of the multi-layered sheet is 0.18 mm. Both the thicknesses of the braze clad layer and the sacrificial layer respectively stacked on respective sides of the core layer were within the range of 20 to 30 μm.

(Microstructure)

Using the measurement methods, respectively, the microstructures of the core layer portion of each multi-layered sheet which is the cold-rolled clad sheet, and the core layer portion of each multi-layered sheet after the heating were observed. Thus, the mean grain size (μm) in the rolling direction in the vertical section in the rolling direction, and the mean number density (precipitates/μm$^3$) of precipitates in which the mean value of centroid diameters observed by a 50000-times TEM on the rolling plane in the central part in the thickness is within the range of 0.1 to 0.5 μm were measured. These results are shown in Table 2. Incidentally, for the mean number density of precipitates, the sample film thickness of the observed site was determined by equal thickness fringes, and the number of precipitates per unit volume of the sample was measured. Herein, the mean grain size of the core layer which is the multi-layered sheet before brazing process which is the material is not shown in Table 5. However, the mean grain size scarcely changes with brazing process for the short time. Therefore, the mean grain size was roughly the same as the mean grain size of the core layer in the multi-layered sheet after brazing process shown in Table 5.

(Mechanical Properties)

The tensile test of each multi-layered sheet after the heating was performed to measure the tensile strength (MPa), 0.2% proof stress (MPa), elongation (%), reduction of area (%), and n value, respectively. These results are shown in Table 6. For the test conditions, a JIS Z2201 No. 5 specimen (25 mm×50 mmGL×gage) perpendicular to the rolling direction was collected from each multi-layered sheet. Thus, the tensile test was performed. The tensile test was performed at room temperature of 20° C. according to JIS Z2241 (1980) (metal material tensile testing method). Further, the crosshead speed was 5 mm/min, and the test was performed at a constant speed until the specimen was fractured. The n value was determined in the following manner. From the endpoint of the yield elongation, the true stress and the true strain are calculated, and plotted on a logarithmic scale with strain as abscissa and stress as ordinate. Thus, the gradient of the straight line represented by measurement points with a true strain within the range of 0.05 to 0.10 was measured.

(Fatigue Properties)

Evaluation of the fatigue properties of each multi-layered sheet after the heating was carried out at ordinary temperatures by means of a known pulsating plane bending fatigue tester shown in FIG. 3, also described in the Patent Document 5. Namely, from each multi-layered sheet after the heating, a 10 mm×60 mm×gage specimen was cut out so as to be in parallel with the rolling direction, resulting in manufacturing of a specimen. One end of the specimen was attached to the fixed side of the pulsating plane bending fatigue tester as shown in the right-hand side of FIG. 3. Then, the other end of the specimen was interposed between knife edges on the driving side as shown in the left-hand side of FIG. 3.

In the bending fatigue test, by moving the positions of the knife edges, plane bending of the specimen was repeatedly performed so as to make the pulsating width constant (5 mm in the vertical direction of FIG. 3) while changing the specimen set length. At this step, in order to reproduce the crack initiation-predominant fatigue regarded as the problem in the present invention, the additional bending stress was adjusted in specimen set length so that the strain amount of the fractured site was as relatively high as about 0.008 at maximum. Under such conditions, the number of repetitions of plane bending until each specimen was fractured was determined. These results are shown in Table 6.

Incidentally, for the strain amount of the fractured site, a strain gage cannot be directly bonded to the fractured site. Therefore, strain gages are bonded at two or three prescribed positions a little apart from the fractured site. Thus, the strain amount of the fractured site is estimated from extrapolation of the strain amount of the fractured site from the strain value of each strain gage at each specimen length. Based on this, the load stress, namely, the specimen set length was adjusted.

(Fractured Surface Observation)

Further, the rolling plane in the vicinity of the fatigue fracture of each multi-layered sheet (after brazing process) after the bending fatigue test was observed by a 100-times SEM. Thus, the mechanism of fatigue fracture was examined from the degree of crack initiation. When the degree of crack initiation is relatively high, the fatigue is the crack initiation-predominant fatigue regarded as the problem in the present invention. When the degree of crack initiation is relatively low, the fatigue is the crack propagation-predominant fatigue. Therefore, with the same kind of aluminum alloy sheets, intentionally (typically), crack initiation-predominant fatigue, and crack propagation-predominant fatigue are formed separately. From the samples serving as the reference, the difference in degree of crack initiation is previously examined. Then, as compared with the samples serving as the reference, when the degree of crack initiation was relatively high, the fatigue was judged as the crack propagation-predominant fatigue. When the degree of crack initiation was relatively low, fatigue was judged as the crack propagation-predominant fatigue. These results are shown in Table 6.

TABLE 4

| Classification | Code | Composition of the core layer of aluminum alloys (mass %, balance Al) | | | | | | | | |
|---|---|---|---|---|---|---|---|---|---|---|
| | | Si | Fe | Cu | Mn | Mg | Cr | Zn | Ti | Zr |
| Inventive Example | a | 0.2 | 0.1 | 0.7 | 1.4 | — | — | — | 0.1 | — |
| | b | 0.8 | 0.1 | 0.7 | 1.4 | — | — | — | 0.1 | — |
| | c | 1.2 | 0.1 | 0.7 | 1.4 | — | — | — | 0.1 | — |
| | d | 1.5 | 0.1 | 0.7 | 1.4 | — | — | — | 0.1 | — |
| | e | 0.8 | 0.1 | 0.05 | 1.4 | — | — | — | 0.1 | — |
| | f | 0.8 | 0.1 | 0.5 | 1.4 | — | — | — | 0.1 | — |
| | g | 0.8 | 0.1 | 1.1 | 1.4 | — | — | — | 0.1 | — |
| | h | 0.8 | 1.0 | 1.2 | 0.3 | — | — | — | 0.1 | — |
| | i | 0.8 | 0.1 | 0.7 | 0.8 | 0.5 | — | — | 0.1 | — |
| | j | 0.8 | 0.1 | 0.7 | 1.8 | 0.3 | — | 0.2 | 0.1 | — |
| | k | 0.8 | 0.1 | 0.7 | 1.4 | — | — | — | 0.03 | — |
| | l | 0.8 | 0.1 | 0.7 | 1.4 | 0.3 | 0.03 | — | 0.3 | 0.2 |
| | m | 0.8 | 0.1 | 0.7 | 1.4 | — | 0.3 | 0.6 | 0.1 | 0.3 |
| Comparative Example | n | 1.6 | 0.1 | 0.7 | 1.4 | — | — | — | 0.1 | — |
| | o | 0.8 | 0.1 | 1.3 | 1.4 | — | — | — | 0.1 | — |
| | p | 0.8 | 0.1 | 0.7 | 1.9 | — | — | — | 0.1 | — |
| | q | 0.8 | 0.1 | 0.7 | 1.4 | — | — | — | 0.4 | — |
| | r | 0.8 | 1.2 | 0.7 | 1.4 | — | — | — | 0.1 | — |

* In the description of the content, "—" represents the identification limit or lower.

TABLE 5

| | | | Multi-layered sheet of aluminum alloys before brazing process | | Multi-layered sheet of aluminum alloys after brazing process | |
|---|---|---|---|---|---|---|
| | | | | Core layer | Core layer | |
| Classification | Code | Core layer composition | Soaking temperature °C. | Precipitate mean number density precipitates/$\mu m^3$ | Precipitate mean number density precipitates/$\mu m^3$ | Mean crystal grain size $\mu m$ |
| Inventive Example | 21 | a | 560 | 15.9 | 8.8 | 69 |
| | 22 | b | 590 | 7.5 | 2.0 | 70 |
| | 23 | c | 550 | 6.3 | 1.6 | 82 |
| | 24 | d | 570 | 5.4 | 1.2 | 95 |
| | 25 | e | 580 | 3.6 | 0.8 | 107 |

TABLE 5-continued

| | | | Multi-layered sheet of aluminum alloys before brazing process | | Multi-layered sheet of aluminum alloys after brazing process | |
| --- | --- | --- | --- | --- | --- | --- |
| | | | | Core layer | Core layer | |
| Classification | Code | Core layer composition | Soaking temperature °C. | Precipitate mean number density precipitates/μm³ | Precipitate mean number density precipitates/μm³ | Mean crystal grain size μm |
| | 26 | f | 560 | 6.9 | 1.6 | 73 |
| | 27 | g | 550 | 13.8 | 2.4 | 66 |
| | 28 | h | 580 | 7.8 | 2.4 | 67 |
| | 29 | i | 590 | 9.6 | 2.8 | 71 |
| | 30 | j | 595 | 9.9 | 2.8 | 70 |
| | 31 | k | 595 | 18.6 | 13.6 | 68 |
| | 32 | l | 570 | 65.4 | 35.6 | 66 |
| | 33 | m | 580 | 135.9 | 70.4 | 56 |
| Comparative Example | 34 | b | 490 | 203.1 | 101.2 | 73 |
| | 35 | b | 450 | 240.9 | 118.0 | 65 |
| | 36 | n | 560 | 162.0 | 91.2 | 69 |
| | 37 | o | 550 | 191.7 | 96.4 | 63 |
| | 38 | p | 570 | 175.5 | 98.4 | 65 |
| | 39 | q | 560 | 153.9 | 82.0 | 74 |
| | 40 | r | 550 | 285.6 | 139.6 | 59 |

TABLE 6

| | | | Multi-layered sheet of aluminum alloys after brazing process | | | | | | | |
| --- | --- | --- | --- | --- | --- | --- | --- | --- | --- | --- |
| | | | Mechanical properties | | | | | Fatigue properties | | |
| | | | | | | | | | Degree of | |
| Classification | Code | Core layer composition | Tensile strength MPa | 0.2% proof stress MPa | Elongation % | Reduction of area % | n value | Number of repetitions of bending | fractured surface crack initiation | Crack initiation predominant |
| Inventive Example | 21 | a | 169 | 54 | 17 | 85 | 0.34 | 12560 | Low | ○ |
| | 22 | b | 167 | 53 | 17 | 86 | 0.34 | 13150 | Low | ○ |
| | 23 | c | 165 | 51 | 17 | 87 | 0.34 | 13290 | Low | ○ |
| | 24 | d | 164 | 50 | 18 | 91 | 0.35 | 13520 | Low | ○ |
| | 25 | e | 162 | 49 | 19 | 93 | 0.35 | 13980 | Low | ○ |
| | 26 | f | 160 | 46 | 19 | 89 | 0.34 | 13210 | Low | ○ |
| | 27 | g | 175 | 60 | 16 | 84 | 0.33 | 12970 | Low | ○ |
| | 28 | h | 165 | 52 | 15 | 84 | 0.32 | 13060 | Low | ○ |
| | 29 | i | 168 | 54 | 17 | 85 | 0.34 | 12950 | Low | ○ |
| | 30 | j | 180 | 72 | 16 | 84 | 0.33 | 12910 | Low | ○ |
| | 31 | k | 188 | 75 | 15 | 84 | 0.32 | 12040 | Low | ○ |
| | 32 | l | 171 | 57 | 18 | 86 | 0.33 | 11800 | Low | ○ |
| | 33 | m | 175 | 60 | 19 | 86 | 0.32 | 11210 | Low | ○ |
| Comparative Example | 34 | b | 176 | 59 | 12 | 73 | 0.29 | 8230 | Low | ○ |
| | 35 | b | 179 | 60 | 12 | 72 | 0.29 | 8020 | Low | ○ |
| | 36 | n | 168 | 55 | 9 | 70 | 0.28 | 8470 | Low | ○ |
| | 37 | o | 181 | 66 | 11 | 75 | 0.30 | 8340 | Low | ○ |
| | 38 | p | 175 | 58 | 13 | 78 | 0.30 | 8290 | Low | ○ |
| | 39 | q | 168 | 55 | 9 | 73 | 0.30 | 8530 | Low | ○ |
| | 40 | r | 186 | 71 | 9 | 77 | 0.29 | 7670 | Low | ○ |

As shown in Table 5, for Inventive Examples 21 to 33, the core layer falls within the inventive component composition range, and is manufactured within the preferred soaking condition range. For this reason, as shown in Table 5, in the core layer of the multi-layered sheet (brazing sheet), the mean number density of precipitates having a size within the range of 0.1 to 0.5 μm is 150 precipitates/μm³ or less. For this reason, even as a multi-layered sheet after brazing process (brazing sheet), the core layer has a microstructure wherein the mean number density of precipitates having a size within the range of 0.1 to 0.5 μm is 80 precipitates/μm³ or less.

As a result, as shown in Table 6, the Inventive Examples 21 to 33 each have a prescribed strength, and further are excellent in properties such as reduction of area and n value, are large in number of repetitions until fracture of the brazed material in the bending fatigue test, and are long in fatigue life. Therefore, from the fractured surface adjacent surface observation result that the degree of crack initiation is low, it is indicated that the Inventive Examples 21 to 33 are excellent in crack propagation-predominant fatigue regarded as the problem in the second invention and the fourth invention of the present application.

In other words, it is indicated as follows: in comparison with respective comparative examples described later, as in the Inventive Examples 21 to 33, when the reduction of area is 84% or more, and the n value is 0.32 or more, the sample is excellent in crack propagation-predominant fatigue regarded as the problem in the second invention and the fourth invention of the present application.

In contrast, for Comparative Examples 34 and 35, the core layer falls within the inventive component composition range (B). However, the soaking temperature is too low. For this reason, as shown in Table 5, in the core layer of the multi-layered sheet, the mean number density of the precipitates exceeds 50 particles/mm². Therefore, also in each multi-layered sheet after the heating, the mean grain size of the core layer is 200 μm or less, but the mean number density of the precipitates exceeds 20 precipitates/μm².

As a result, as shown in Table 6, Comparative Examples 34 and 35 each have a prescribed strength. However, the reduction of area is less than 85%, and the n value is less than 0.32. Thus, the samples are inferior in these properties. For this reason, the number of repetitions until fracture of the brazed material in the bending fatigue test is small, and the fatigue life is short. Therefore, from the observation result that the degree of crack initiation in the fractured site adjacent rolled surface is low, it is indicated that Comparative Examples 34 and 35 are inferior in crack propagation-predominant fatigue.

For Comparative Examples 36 to 40, the core layers have component compositions n, o, p, q, and r (Table 4) departing from the inventive scope. Namely, the contents of Si, Cu, Mn, Ti, and Fe exceeds their respective upper limits, and are too high. As a result, each multi-layered sheet after the heating is small in number of repetitions until fracture of the brazed material in the bending fatigue test, and is short in fatigue life.

The results of Examples up to this point support the critical significance or effects of each requirement of the second invention and the fourth invention of the present application for the multi-layered sheet for heat exchanger or the multi-layered sheet after brazing process to be excellent in mechanical properties and crack initiation-predominant fatigue.

INDUSTRIAL APPLICABILITY

In accordance with the present invention, there can be provided a multi-layered sheet of aluminum alloys or a multi-layered sheet after brazing process which can be thinned and has excellent fatigue properties of a multi-layered sheet after brazing process such as an aluminum-alloy radiator tube, or a multi-layered sheet such as an aluminum-alloy brazing sheet. Therefore, the present invention is preferably used for a heat exchanger made of aluminum alloy for automobile or the like, which is required to have a reduced thickness of a radiator tube, and to have excellent fatigue properties.

As described up to this point, the present invention was described specifically, and with reference to specific embodiments. However, it is apparent to those skilled in the art that various changes and modifications may be made without departing from the spirit and scope of the present invention. The present application is based on Japanese Patent Application (Japanese Patent Application No. 2008-030679) filed on Feb. 12, 2008, Japanese Patent Application (Japanese Patent Application No. 2008-030680) filed on Feb. 12, 2008, and Japanese Patent Application (Japanese Patent Application No. 2008-299562) filed on Nov. 25, 2008, the contents of which are hereby incorporated by reference.

The invention claimed is:

1. A multi-layered sheet of aluminum alloys, comprising: at least a core layer and a sacrificial layer, being clad, to be utilized for a heat exchanger by brazing,
the core layer having an aluminum alloy composition comprising:
Si: 0.2 to 1.5 mass %;
Cu: 0.2 to 1.2 mass %;
Mn: 0.2 to 1.4 mass %;
Ti: 0.03 to 0.3 mass %;
Fe: 1.0 mass % or less; and
a balance being Al and inevitable impurities, and
having a microstructure wherein a mean number density of dispersed particles, in which a mean value of centroid diameters observed by a 500-times SEM on a rolling plane of the core layer is 1 μm or more, is 7000 particles/mm² or less.

2. The multi-layered sheet of aluminum alloys according to claim 1, wherein the core layer further comprises at least one of
Cr: 0.03 to 0.3 mass %;
Zn: 0.2 to 1.0 mass %; and
Zr: 0.03 to 0.3 mass %.

3. The multi-layered sheet of aluminum alloys according to claim 1, wherein the core layer further comprises Mg: 0.5 mass % or less.

4. The multi-layered sheet of aluminum alloys according to claim 1, wherein a gage of the core layer is less than 0.25 mm thick.

5. The multi-layered sheet of aluminum alloys according to claim 1, wherein a gage of the multi-layered sheet is less than 0.3 mm thick.

6. A multi-layered sheet of aluminum alloys, comprising: at least a core layer and a sacrificial layer, being clad, to be formed into a heat exchanger by brazing,
the core layer having an aluminum alloy composition comprising:
Si: 0.2 to 1.5 mass %;
Cu: 0.05 to 1.2 mass %;
Mn: 0.3 to 1.8 mass %;
Ti: 0.03 to 0.3 mass %
Fe: 1.0 mass % or less; and
a balance being Al and inevitable impurities, and
having a microstructure wherein a mean number density of precipitates, in which a mean value of centroid diameters observed by a 50000-times TEM on a rolling plane in a central part in thickness of the core layer is within a range of 0.1 to 0.5 μm, is 150 precipitates/μm³ or less.

7. The multi-layered sheet of aluminum alloys according to claim 6, wherein the core layer further comprises at least one of
Cr: 0.03 to 0.3 mass %;
Zn: 0.2 to 1.0 mass %; and
Zr: 0.03 to 0.3 mass %.

8. The multi-layered sheet of aluminum alloys according to claim 6, wherein the core layer further comprises Mg: 0.5 mass % or less.

9. The multi-layered sheet of aluminum alloys according to claim 6, wherein a gage of the core layer is less than 0.25 mm thick.

10. The multi-layered sheet of aluminum alloys according to claim 6, wherein a gage of the multi-layered sheet is less than 0.3 mm thick.

11. A multi-layered sheet of aluminum alloys, comprising: at least a core layer and a sacrificial layer, being clad,
the core layer having an aluminum alloy composition comprising:
Si: 0.2 to 1.5 mass %;
Cu: 0.2 to 1.2 mass %;
Mn: 0.2 to 1.4 mass %;
Ti: 0.03 to 0.3 mass %;
Fe: 1.0 mass % or less; and
a balance being Al and inevitable impurities,
having, as a microstructure after brazing process, a microstructure wherein a mean grain size of a rolling direction in a vertical section parallel with the rolling direction of the core layer is 200 μm or less, and a mean number density of dispersed particles, in which a mean value of centroid diameters observed by a 500-times SEM on a rolling plane of the core layer is 1 μm or more, is 6000 particles/mm² or less.

12. The multi-layered sheet of aluminum alloys according to claim 11, wherein the core layer further comprises at least one of
Cr: 0.03 to 0.3 mass %;
Zn: 0.2 to 1.0 mass %; and
Zr: 0.03 to 0.3 mass %.

13. The multi-layered sheet of aluminum alloys according to claim 11, wherein the core layer further comprises Mg: 0.5 mass % or less.

14. The multi-layered sheet of aluminum alloys according to claim 11, wherein a gage of the core layer is less than 0.25 mm thick.

15. The multi-layered sheet of aluminum alloys according to claim 11, wherein a gage of the multi-layered sheet is less than 0.3 mm thick.

16. A multi-layered sheet of aluminum alloys, comprising: at least a core layer and a sacrificial layer, being clad,
the core layer having an aluminum alloy composition comprising:
Si: 0.2 to 1.5 mass %;
Cu: 0.05 to 1.2 mass %;
Mn: 0.3 to 1.8 mass %;
Ti: 0.03 to 0.3 mass %;
Fe: 1.0 mass % or less; and
a balance being Al and inevitable impurities,
having, as a microstructure after brazing process, a structure wherein a mean grain size of a rolling direction in a vertical section parallel with the rolling direction of the core layer is 200 μm or less, and a mean number density of precipitates, in which a mean value of centroid diameters observed by a 50000-times TEM on a rolling plane in a central part in thickness of the core layer is within a range of 0.1 to 0.5 μm, is 80 precipitates/μm³ or less.

17. The multi-layered sheet of aluminum alloys according to claim 16, wherein the core layer further comprises at least one of
Cr: 0.03 to 0.3 mass %;
Zn: 0.2 to 1.0 mass %; and
Zr: 0.03 to 0.3 mass %.

18. The multi-layered sheet of aluminum alloys according to claim 16, wherein the core layer further comprises Mg: 0.5 mass % or less.

19. The multi-layered sheet of aluminum alloys according to claim 16, wherein a gage of the core layer is less than 0.25 mm thick.

20. The multi-layered sheet of aluminum alloys according to claim 16, wherein a gage of the multi-layered sheet is less than 0.3 mm thick.

* * * * *